United States Patent
Rayner et al.

(10) Patent No.: US 11,794,882 B1
(45) Date of Patent: Oct. 24, 2023

(54) SHOCK ABSORPTION SYSTEM FOR AN UNMANNED AERIAL VEHICLE

(71) Applicant: SURVICE Engineering Company, LLC, Belcamp, MD (US)

(72) Inventors: Andrew John Rayner, Baltimore, MD (US); Mark Thomas Butkiewicz, North East, MD (US)

(73) Assignee: SURVICE Engineering Company LLC, Belcamp, MD (US)

( * ) Notice: Subject to any disclaimer, the term of this patent is extended or adjusted under 35 U.S.C. 154(b) by 0 days.

(21) Appl. No.: 17/887,466

(22) Filed: Aug. 14, 2022

(51) Int. Cl.
| | |
|---|---|
| B64C 25/62 | (2006.01) |
| B64C 39/02 | (2023.01) |
| B64C 25/52 | (2006.01) |
| B64U 10/13 | (2023.01) |
| B64U 60/00 | (2023.01) |
| B64C 25/32 | (2006.01) |

(52) U.S. Cl.
CPC .............. B64C 25/62 (2013.01); B64C 25/52 (2013.01); B64U 60/00 (2023.01); *B64C 2025/325* (2013.01)

(58) Field of Classification Search
CPC ......... B64C 25/62; B64C 25/58; B64C 25/52; B64C 2025/325; B64U 60/00
See application file for complete search history.

(56) References Cited

U.S. PATENT DOCUMENTS

| | | | |
|---|---|---|---|
| 2,332,021 A | * | 10/1943 | Smith ..................... B64C 25/52 244/108 |
| 9,868,520 B1 | | 1/2018 | Winshtein |
| 10,800,547 B1 | | 10/2020 | McGann et al. |
| 10,850,834 B2 | | 12/2020 | Duval et al. |
| 2008/0111022 A1 | | 5/2008 | Lahargou et al. |
| 2011/0133378 A1 | | 6/2011 | Dunn |
| 2017/0341738 A1 | | 11/2017 | Grieser |
| 2019/0344897 A1 | | 11/2019 | Reasner et al. |
| 2020/0039466 A1 | | 2/2020 | Goto |
| 2020/0231291 A1 | | 7/2020 | Wakatsuki et al. |
| 2021/0024203 A1 | | 1/2021 | Chappell et al. |
| 2021/0053691 A1 | | 2/2021 | Goto |

FOREIGN PATENT DOCUMENTS

| | | | |
|---|---|---|---|
| CN | 215323286 U | * | 12/2021 |
| CN | 113911324 A | * | 1/2022 |
| CN | 114435610 A | * | 5/2022 |

* cited by examiner

*Primary Examiner* — Joshua J Michener
*Assistant Examiner* — Arfan Y. Sinaki
(74) *Attorney, Agent, or Firm* — Peter Loffler

(57) ABSTRACT

A shock absorbing system for use when landing an unmanned aerial vehicle uses a rocker arm pivotally attached to each landing leg of the vehicle. A strut bracket is attached to each landing leg below the rocker arm. A damper leg is pivotally attached to the rocker arm on one side of the landing leg attachment and the upper end of a damper-loaded strut is pivotally attached to the rocker arm on an opposing side of the landing leg attachment. The base of the strut is fixedly attached to the strut bracket. As the vehicle, it places a downward force on each landing leg which cause the bracket to slide downward along the damper leg, causing the damper leg to pivot its end of the rocker arm upwardly and thus the strut end downwardly causing the strut to compress against the bias of the damper and thereby dampen the landing. Damper leg pairs can be joined by a skid.

16 Claims, 5 Drawing Sheets

SHOCK ABSORPTION SYSTEM FOR AN UNMANNED AERIAL VEHICLE

BACKGROUND OF THE INVENTION

1. Field of the Invention

The present invention relates to a shock absorption system attached to the landing gear of a drone in order to absorb the shock from a hard landing.

2. Background of the Prior Art

Recently, the technology surrounding unmanned aerial vehicles, such as drones, has exploded. No longer are drones simply kid's toys that fly around the neighborhood snapping pictures and videos of the homes and pets in the neighborhood, drones are now sophisticated work tools that perform a wide variety of functions in many diverse fields. Drones perform such varied tasks as painting buildings, monitoring crops, checking building envelope integrity, checking bridge structural integrity, terrain mapping, thermal imaged based and visual based search and rescue operations, weather monitoring, command and control of aircraft, providing direction for on the ground personnel such as firefighters, police, soldiers, etc., and border control among others. Drones also continue to be used as photographic instruments, but instead of ferrying a small inexpensive camera or possibly a cell phone with video capability, drones now come equipped with highly sophisticated and expensive visual equipment, including visual, infrared, x-ray, thermal, and others that are used in various types of shoots. Additionally, drones are used to transport various items, such as food and water, to remotely located victims of a natural disaster, packages for home delivery, and supplies to remote deployed warfighters, among other tasks. Additionally, drones are used to carry and launch munitions against enemy targets and personnel.

Controlling drones has also advanced with the technology. Drones are still controlled via line-of-sight operation where an operator has direct visual contact with the drone and controls the drone's flight via a joystick type of control. Other drones are controlled via a remote station that may be located miles away or even a continent away with the operator relying on visual feedback coupled with onboard sensors to help control the flight as well as the actions occasioned by the drone. Still other drones fly autonomously either via a preprogrammed or on-the-fly dynamic routing. Once launched, such drones are fly and forget.

Commensurate with the rise in sophistication of the drones is the rise in the costs of both the drones and the onboard cargoes that are carried by the drones. With the attendant rise in the costs of drones and cargo, comes the attendant need to protect the drones from costly mishaps. An inexpensive drone bought by a parent at a box store can crash into a tree or into the ground, and can either be readily able to fly again or easily replaced due to the relatively low cost. However, if an expensive drone carrying a high value cargo makes a hard landing, the drone can suffer significant and costly damage and damage to or possibly complete loss of its cargo can also occur.

As drones are unmanned, there are many reasons that can cause a hard landing. Being light by design, a drone is strongly affected by wind, particularly downdrafts. A drone making an emergency delivery into a mountain pass during winter can suddenly be forced downward by a downdraft, resulting in drone and/or cargo damage. Hard landings can also be caused by landing on obstacles, especially if the drone is being operated by an inexperienced pilot. Additionally, despite best planning efforts, a drone may simply exhaust its energy supply and come down to earth hard.

Drone designers address hard landing issues by providing the drone with sophisticated avionics that help provide a gentle touchdown, even if operator error occurs or even if the battery begins to run low. Drone operators address hard landings by providing increased training, especially for operators of particularly high value drones. However, even with sophisticated engineering and highly trained operators, hard landing will occur.

In order to address the problems and costs associated with hard landings, drones have been designed to have a parachute onboard so that if a hard landing is anticipated, due to an unexpected downdraft or loss of drone lift, the parachute deploys allowing the drone to achieve a soft landing. Other drones have been designed with an airbag that deploys upon drone contact with the ground in order to cushion the drone from the impact in much the same way passengers of a vehicle are cushioned in a crash of the vehicle.

While these devices can prevent costly damage to drone and cargo, they are not without their shortcomings. Both a parachute and an airbag system must be carried by the drone, thereby reducing not only the lift capacity of the drone, but more importantly, the volumetric space for cargo. The deployment system for either a parachute or an airbag is sophisticated and must be integrated into the overall drone avionics control system, so as substantially increase the cost of the drone. If such a system is utilized, then an operator must reset the system—repack the parachute or repack or replace the airbag—which is not only time-consuming, but may be difficult, especially in a situation where the drone is making a delivery to an unmanned location, such as a yet to be reached forward base for a soldier, where the drone is to immediately launch another mission after delivery.

What is needed is a system that helps cushion a drone and its cargo from hard landings so as to minimize damage and drone operation delays from such hard landings. Specifically, such a system must not be unduly heavy and should not take up cargo real estate aboard the drone. Such a system, if used, need not rely on a human operator to reset, so that that drone can immediately commence it next mission after the hard landing.

SUMMARY OF THE INVENTION

The shock absorption system for an unmanned aerial vehicle of the present invention addresses the aforementioned needs in the art by providing a purely mechanical system that helps protect a drone and its cargo during a hard landing. The shock absorption system for an unmanned aerial vehicle is a lightweight system that attaches to the drone's existing landing gear so as to not take up any of the cargo real estate of the drone. The shock absorption system for an unmanned aerial vehicle is purely mechanical in operation so that it does not rely on or need to be integrated into the drone's electronic control system, thereby making the system relatively inexpensive. The shock absorption system for an unmanned aerial vehicle is self-resetting so that if the system is utilized to absorb the shock of a lard landing, the drone is immediately ready for its next mission.

The shock absorption system for an unmanned aerial vehicle of the present invention is comprised of a first damper leg that has a first proximal end and a first distal end. A strut bracket is fixedly attached to the landing leg of the unmanned aerial vehicle. At rocker arm is pivotally attached to the landing leg and is located between the strut bracket and the unmanned aerial vehicle. The damper leg slidably passes through the strut bracket and the proximal end of the damper leg is pivotally attached to the rocker arm. A first strut has a body with a base that is fixedly attached to the strut bracket. The strut also has a shaft partially and slidably disposed within the body. The strut has a damper that has a first damper end attached to the body of the strut and a damper end that is pivotally attached to the rocker arm. This pivotal attachment of the rocker arm to the landing leg is disposed between the pivotal attachment of the proximal end of the damper leg to the rocker arm and the pivotal attachment of the second damper end of the damper to the rocker arm. Each landing leg of the unmanned aerial vehicle receives a substantially similar structure. The landing end of the landing leg is located between the proximal end and the distal end of the damper leg so that the unmanned aerial vehicle lands on the damper legs and not on the vehicle's landing legs. The damper may be either a coil spring, or a gas-filled cylinder or other similar device that provides similar mechanical energy storage upon compression. The first damper end of the damper is attached to the body of the strut via a damper seat that encircles and is fixedly attached to the body of the strut while the second damper end of the damper is attached to the rocker arm via a damper cap. Pairs of damper legs can be connected to each other via a skid so that the skid makes actual ground contact upon landing. The skid may be encircled by a cushioning member.

BRIEF DESCRIPTION OF THE DRAWINGS

Similar reference numerals refer to similar parts throughout the several views of the drawings.

DESCRIPTION OF THE PREFERRED EMBODIMENT

Figure 1:
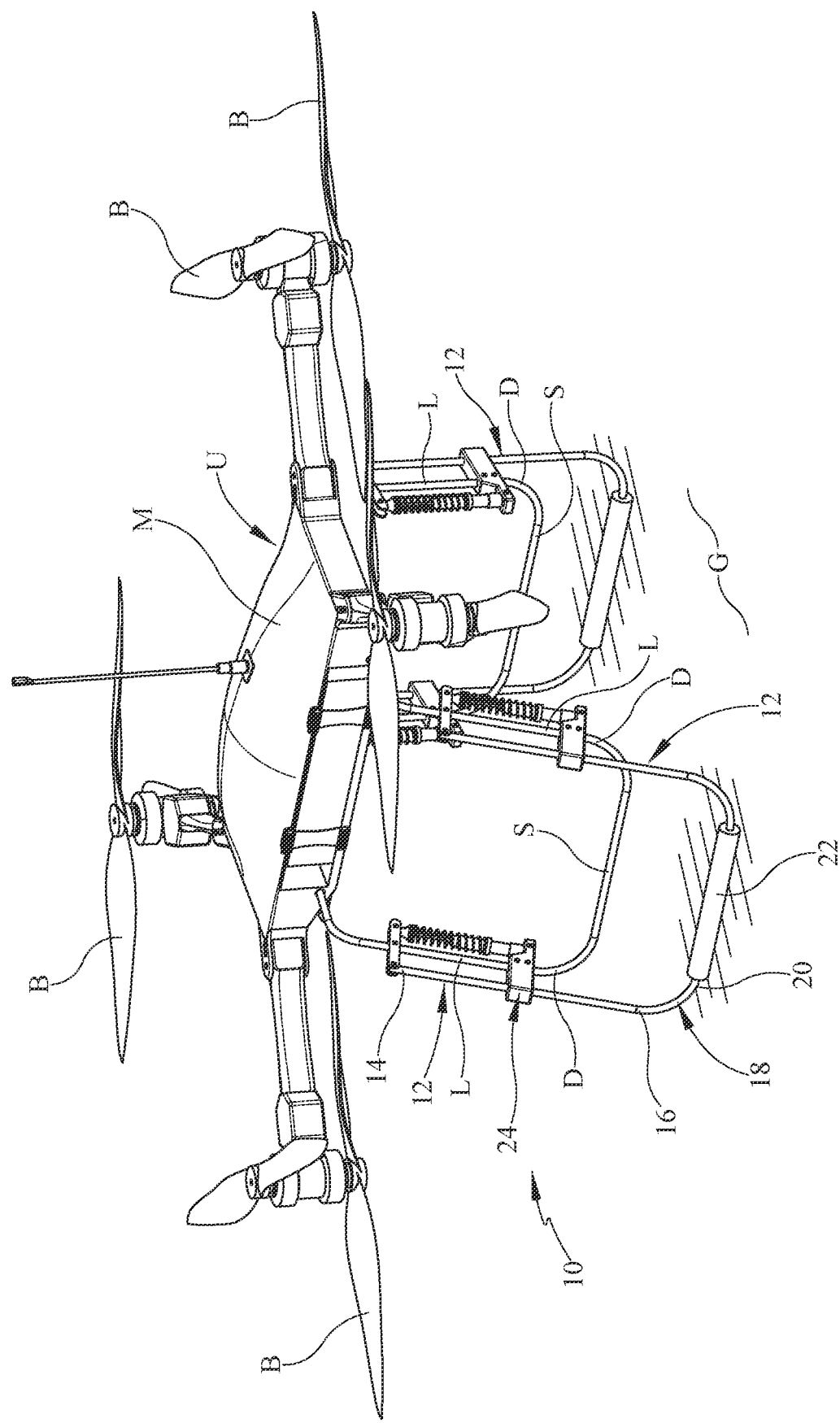
FIG. 1 is an environmental perspective view of the shock absorption system for an unmanned aerial vehicle of the present invention installed on a drone.
Figure 2:
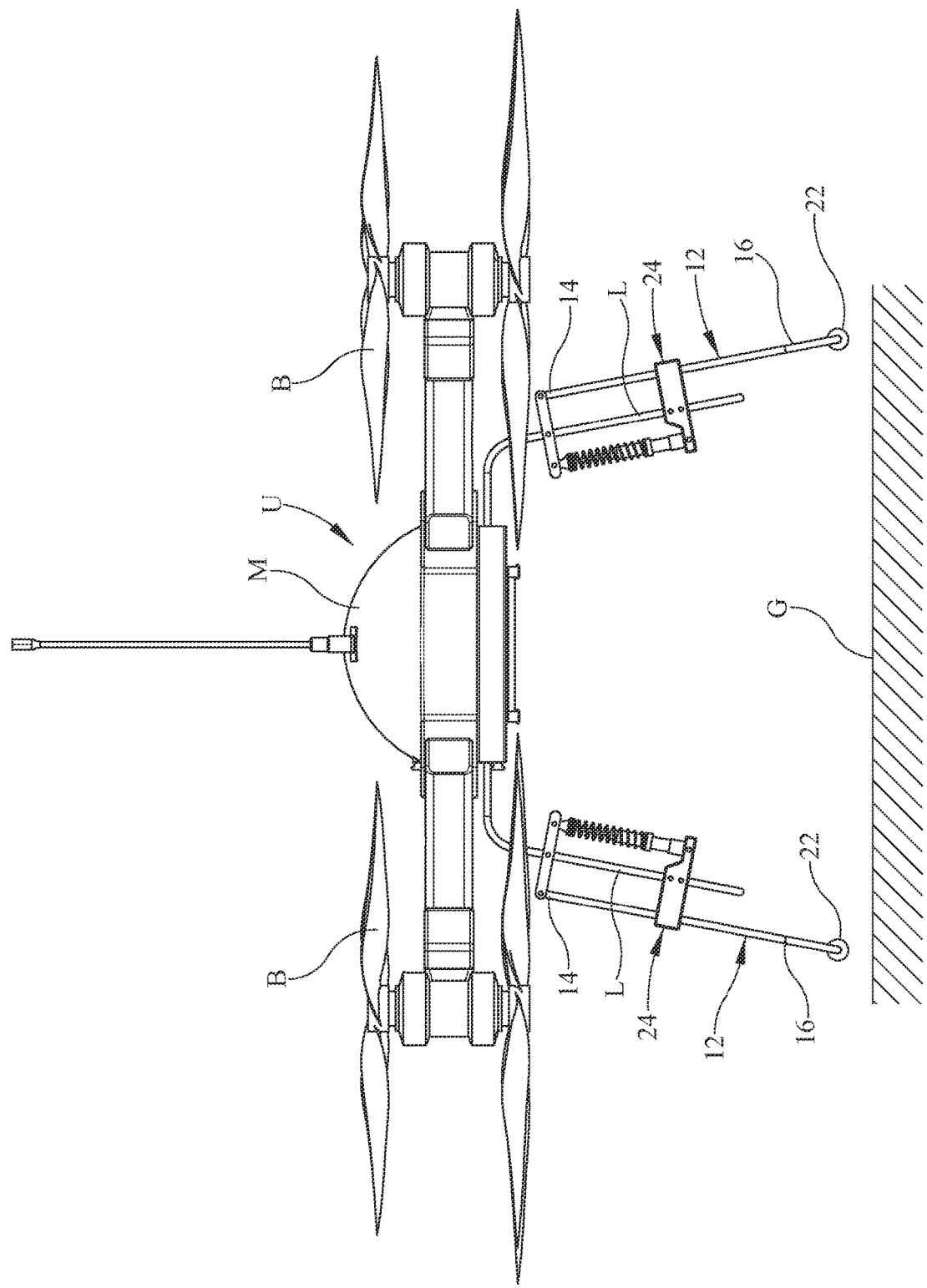
FIG. 2 is an environmental plan view of the shock absorption system for an unmanned aerial vehicle installed on a drone just prior to the drone landing.
Figure 3:
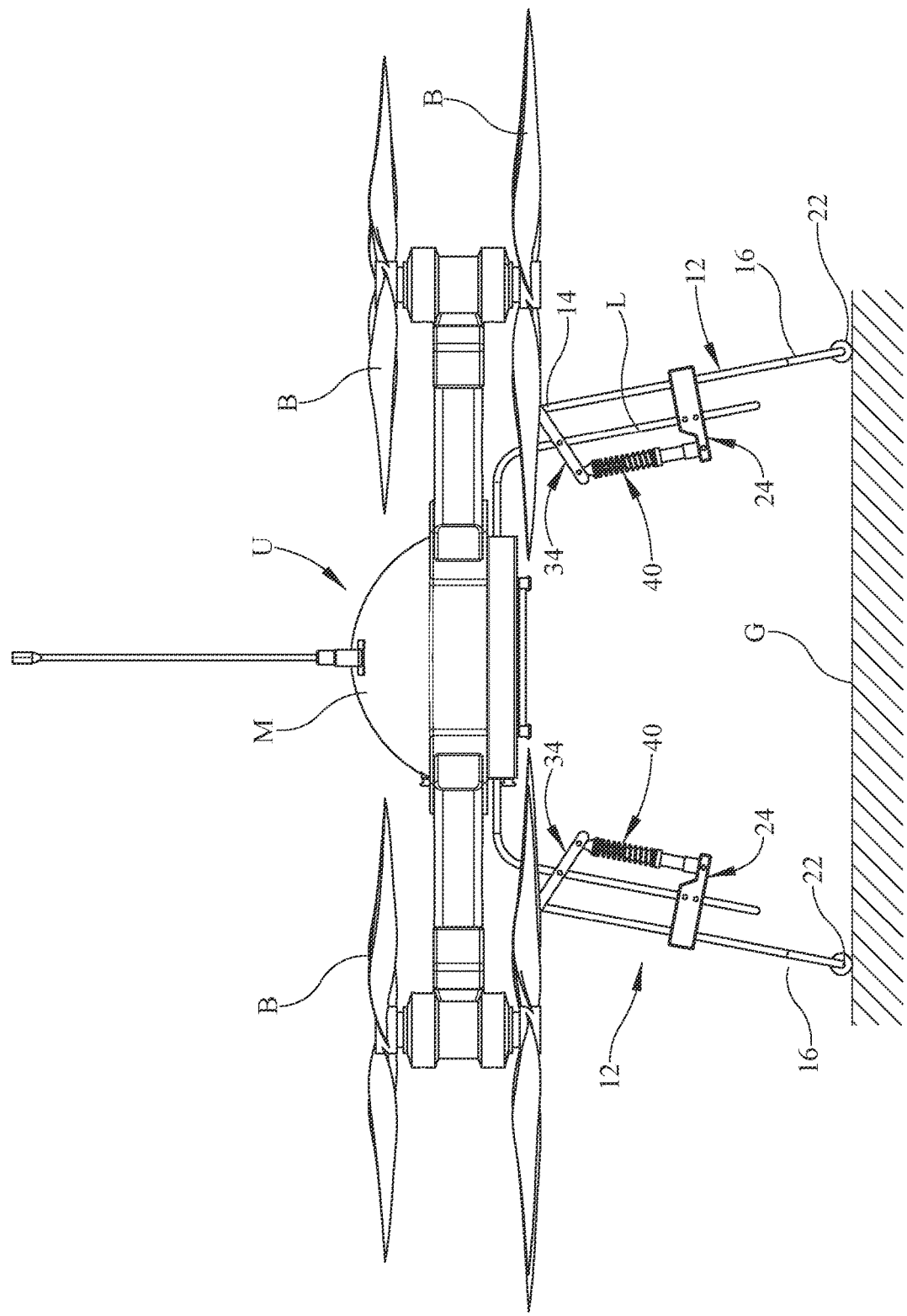
FIG. 3 is an environmental plan view of the shock absorption system for an unmanned aerial vehicle installed on a drone upon landing.
Figure 4:
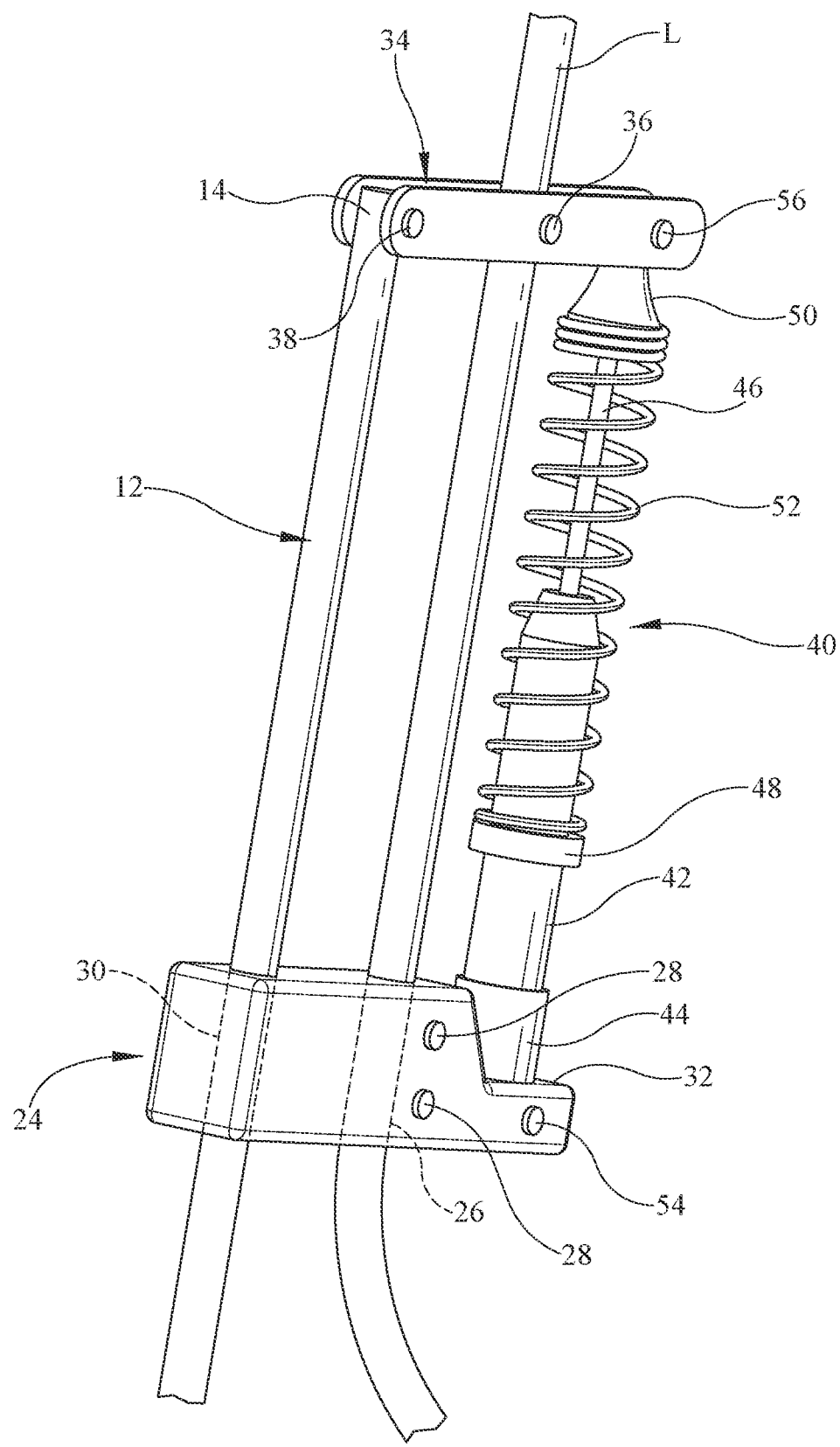
FIG. 4 is a close-up perspective view of the energy absorption system of shock absorption system for an unmanned aerial vehicle.
Figure 5:
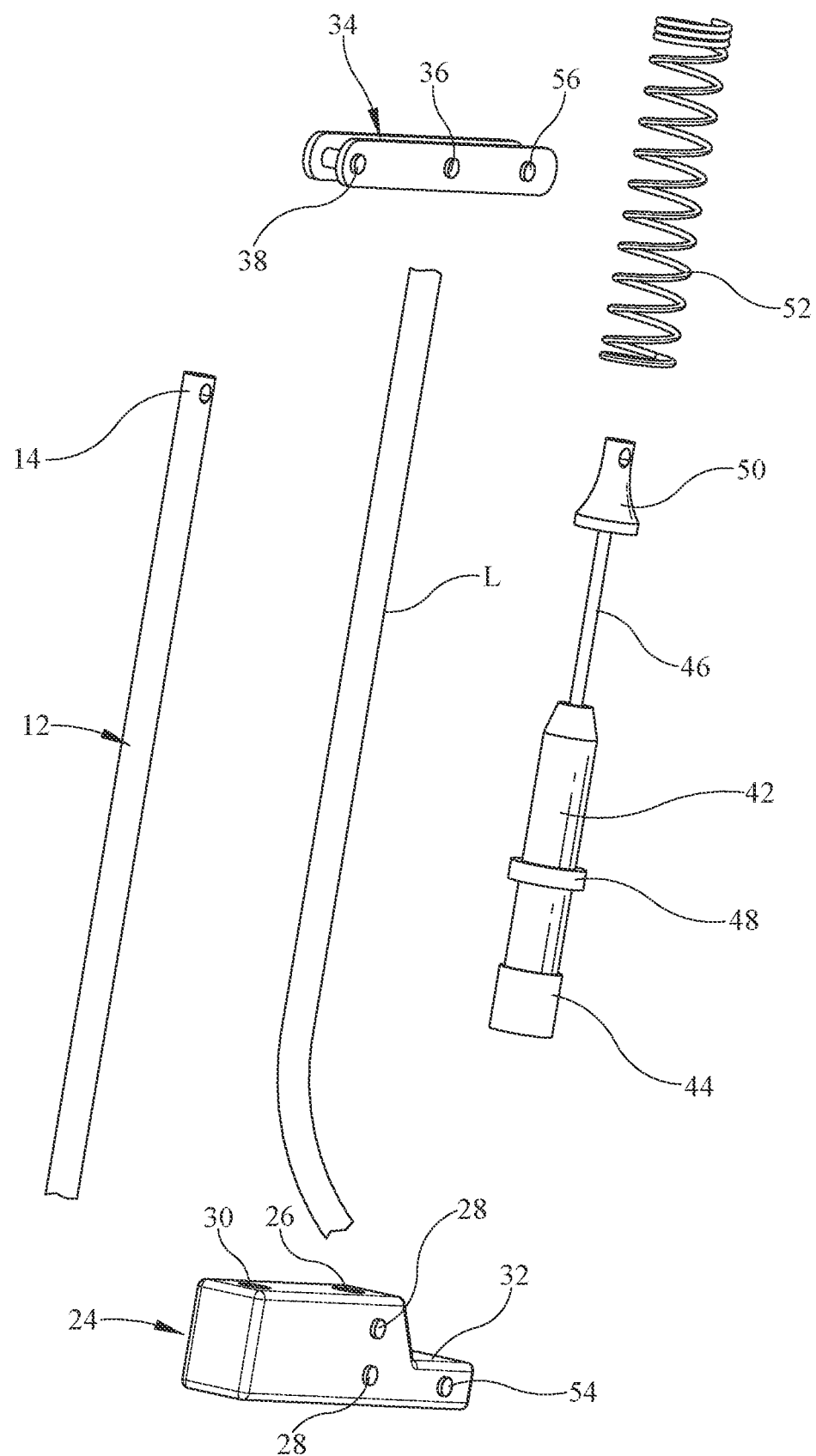
FIG. 5 is an exploded perspective view of FIG. 4.

As seen in FIGS. 1-3, an unmanned aerial vehicle is a typical drone U that has a body M and a set of lift blades B powered in appropriate fashion. As is typical, a series of landing legs L descend downwardly, often at a slight angle off of vertical, from the body M, such that pairs of the landing legs L may be joined by a skid S at the landing legs' distal ends D, one skid S per side of the drone U. The skids S provide the main surface contact when the drone U lands on a desired surface G with the drone U supported on the surface G via the landing legs L. Often, but not exclusively, the four landing legs L that comprise the landing system of the drone U are formed as a single unitary landing carriage that is attached to the drone body M in appropriate fashion.

Referring now to the drawings, it is seen that the shock absorption system for an unmanned aerial vehicle of the present invention, generally denoted by reference numeral 10, is comprised of series of damper legs 12, one damper leg 12 per landing leg of the drone U for which shock absorption is desired. Each damper leg 12 has a proximal end 14 and a distal end 16. As seen, similar to landing leg L pairs, a pair of damper legs 12 can be formed into a generally U-shaped damper sub-carriage 18 by connecting a pair of damper legs 12 at their respective distal ends 16 by a damper skid 20. Each damper leg 12 pair and its connecting damper skid 20 can be formed as a single unitary (indeed monolithic) unit. A large portion of each damper skid 20 may be encircled by a cushioning member 22 made from an appropriate resilient material such as closed cell foam, neoprene, etc. The damper legs 12 and their connecting damper skids 20 are made from a strong lightweight material such as a hard plastic, tubular aluminum, etc.

A strut bracket 24 is provided such that a landing leg L passes through a first opening 26 on the strut bracket 24 and the strut bracket 24 is secured to the landing leg L proximate the distal end D of the landing leg L, via appropriate attachment pins 28 that pass through the strut bracket 24 and the landing leg L. The strut bracket 24 also has a second opening 30 through which a damper leg 12 passes. The strut bracket 24 also has a strut seat 32.

A rocker arm 34 is provided and is pivotally attached to a landing leg L proximate the proximal end P of the landing leg L, the pivotal attachment being via an appropriate landing leg pivot pin 36. A damper leg 12 passes through the second opening 30 on the strut bracket 24 such that the proximal end 14 of the damper leg 12 is pivotally attached to the rocker arm 34 via an appropriate damper leg pivot pin 38.

A strut 40 is provided and has a strut body 42, a strut base 44 and a strut shaft 46 that is partially and slidably received within the strut body 42. A lower damper seat 48 encircles and is secured to a portion of the strut body 42 while an upper damper cap 50 is attached to an end of the strut shaft 46. A damper, which may include the illustrated coil spring 52, a gas filled cylinder (typical shock absorber filled with oil and an appropriate inert gas such as nitrogen), or other similar energy storage device, has one end seated within the lower damper seat 48 and is secured threat in appropriate fashion, while the opposing end of the damper 52 is secured to the upper damper cap 50. The damper 52, if in the form of a spring, coils about a portion of the strut body 42 and the strut shaft 46. The strut 40 is positioned so that its strut base 44 is seated within the strut seat 32 of the strut bracket 24 and secured threat via a securement pin 54. The upper damper cap 50 is pivotally attached to the rocker arm 34 via damper cap pivot pin 56. The pivotal attachment of the damper leg 12 to the rocker arm 34 and the pivotal attachment of the upper damper cap 50 to the rocker arm 34 are on opposing sides of the pivotal attachment point of the landing leg L to the rocker arm 34 so that the landing leg pivot pin 36 acts as a fulcrum point for the rocker arm 34.

A damper leg 12—strut bracket 24—rocker arm 34—strut 40 assembly is attached to each of the landing legs L of the drone U. As noted previously, pairs of damper legs 12 can be connected via a damper skid 20 in order to form a damper sub-carriage 18 so that two damper sub-carriages 18 are installed on a four-landing leg L drone U. As seen, whenever the drone U is on a ground surface G (which can include buildings, ship decks, etc.,), the drone U sits on and is supported on the ground surface G via the damper sub-carriages 18, the drone U does not sit on its own landing legs L.

In operation, the shock absorption system for an unmanned aerial vehicle 10 is installed as noted above. As the drone U lands, the damper sub-carriages 18 make ground G contact. As the landing legs L of the drone are fixedly attached to the strut bracket 24 while the damper legs 12 of the shock absorption system for an unmanned aerial vehicle 10 slide within the second opening 30 of the strut bracket 24, the downward moment of the landing drone U causes the strut bracket 24 to slide downwardly along the damper leg 12 so that the damper leg 12 moves upwardly toward the drone U. This upward movement of the damper leg 12 results in an upward push of the damper leg's end of the rocker arm 34. This causes the rocker arm 34 to pivot about its landing leg pivot pin 36. This pivot in turn results in the opposing end of the rocker arm 34 (the end opposite the end that has the damper leg 12 attached to the rocker arm 34) to pivot downwardly. This downward pivot of this end of the rocker arm 34 pushes on the damper cap 50. As the strut base 44 of the strut 40 is fixedly attached to the strut bracket 24 and as the strut bracket 24 is fixedly attached (not pivotally attached) to the landing leg L of the drone U, the downward push of the upper damper cap 50 results in the upper damper cap 50 pushing against the bias of the damper 52 thereby compressing the damper 52. The downward travel of the upper damper cap 50 also pushes the strut shaft 46 into the strut body 42 of the strut 40. As less downward force is exerted by the drone U on its landing leg L, the damper 52 biases the upper damper cap 50 and its attached shaft strut 46 back toward its initial position—of course, due to the weight of the drone U and any cargo it may be carrying, the upper damper cap 50 and its attached strut shaft 46 do not return to the same position as when there is no weight sprung on the damper legs 12. Each of the damper legs 12 and its strut bracket 24—rocker arm 34—strut 40 assembly behaves in similar fashion, thereby dampening the force of landing of the drone U. The drone U sits on the ground surface G the damper skids 20 (including its cushioning member 22) or directly on the damper legs if each damper leg is independent and not connected to another damper leg via a skid.

While the invention has been particularly shown and described with reference to an embodiment thereof, it will be appreciated by those skilled in the art that various changes in form and detail may be made without departing from the spirit and scope of the invention.

We claim:

1. A landing system for an unmanned aerial vehicle, the aerial vehicle having a first landing leg depending downwardly therefrom, the first landing leg having a first landing end, the landing system comprising:
    a first damper leg having a first proximal end and a first distal end;
    a first strut bracket adapted to be fixedly attached to the first landing leg;
    a first rocker arm adapted to be pivotally attached to the first landing leg, the first rocker arm located between the first strut bracket and the unmanned aerial vehicle, and such that the first damper leg slidably passes through the first strut bracket and the first proximal end of the first damper leg is pivotally attached to the first rocker arm;
    a first strut having a first body with a first base, the first base fixedly attached to the first strut bracket, the first strut also having a first shaft partially and slidably disposed within the first body, the first strut having a first damper having a first damper end attached to the first body and a second damper end pivotally attached to the first rocker arm; and
    wherein the pivotal attachment of the first rocker arm to the first landing leg is disposed between the pivotal attachment of the first proximal end of the first damper leg to the first rocker arm and the pivotal attachment of the second damper end of the first damper to the first rocker arm.

2. The landing system as in claim 1 wherein the first landing end of the first landing leg is located between the first proximal end and the first distal end of the first damper leg.

3. The landing system as in claim 1 wherein the first damper is a coil spring.

4. The landing system as in claim 1 wherein the first damper is a gas filled cylinder.

5. The landing system as in claim 1 wherein the first damper is either a coil spring or a gas filled cylinder.

6. The landing system as in claim 1 wherein the first damper end of the first damper is attached to the first body of the first strut via a first damper seat that encircles and is fixedly attached to the first body of the first strut.

7. The landing system as in claim 6 wherein the second damper end of the first damper is attached to the first rocker arm via a first damper cap.

8. The landing system as in claim 1 wherein the unmanned aerial vehicle has a second landing leg depending downwardly therefrom, the second landing leg having a second landing end, the landing system further comprising:
    a second damper leg having a second proximal end and a second distal end;
    a second strut bracket adapted to be fixedly attached to the second landing leg;
    a second rocker arm adapted to be pivotally attached to the second landing leg, the second rocker arm located between the second strut bracket and the unmanned aerial vehicle, and such that the second damper leg slidably passes through the second strut bracket and the second proximal end of the second damper leg is pivotally attached to the second rocker arm;
    a second strut having a second body with a second base, the first second fixedly attached to the second strut bracket, the second strut also having a second shaft partially and slidably disposed within the second body, the second strut also having a second damper having a third damper end attached to the second body and a fourth damper end pivotally attached to the second rocker arm; and
    wherein the pivotal attachment of the second rocker arm to the second landing leg is disposed between the pivotal attachment of the second proximal end of the second damper leg to the second rocker arm and the pivotal attachment of the fourth damper end of the second damper to the second rocker arm.

9. The landing system as in claim 8 wherein the first landing end of the first landing leg is located between the first proximal end and the first distal end of the first damper leg and the second landing end of the second landing leg is located between the second proximal end and the second distal end of the second damper leg.

10. The landing system as in claim 8 wherein the first damper and the second damper are each coil springs.

11. The landing system as in claim 8 wherein the first damper and the second damper are each either coil springs or gas filled cylinders.

12. The landing system as in claim 8 wherein the first damper end of the first damper is attached to the first body of the first strut via a first damper seat that encircles and is fixedly attached to the first body of the first strut and the third damper end of the second damper is attached to the second body of the second strut via a second damper seat that encircles and is fixedly attached to the second body of the second strut.

13. The landing system as in claim 12 wherein the second damper end of the first damper is attached to the first rocker arm via a first damper cap and the fourth damper end of the second damper is attached to the second rocker arm via a second damper cap.

14. The landing system as in claim 8 further comprising a skid connecting the first distal end of the first damper leg and the second distal end of the second damper leg forming a damper sub-carriage.

15. The landing system as in claim 14 wherein the damper sub-carriage is U-shaped.

16. The landing system as in claim 14 further comprising a cushioning member encircling the skid.

\* \* \* \* \*

UNITED STATES PATENT AND TRADEMARK OFFICE
CERTIFICATE OF CORRECTION

| | | |
|---|---|---|
| PATENT NO. | : 11,794,882 B1 | Page 1 of 1 |
| APPLICATION NO. | : 17/887466 | |
| DATED | : October 24, 2023 | |
| INVENTOR(S) | : Andrew John Rayner and Mark Thomas Butkiewicz | |

It is certified that error appears in the above-identified patent and that said Letters Patent is hereby corrected as shown below:

In the Specification

On Column 1, Line 11 before the "BACKGROUND OF THE INVENTION" please insert the following paragraph:
--STATEMENT REGARDING FEDERALLY SPONSORED RESEARCH OR DEVELOPMENT
This invention was made with Government support under Other Transaction Agreement No. W15QKN-18-9-1008 awarded by the US Army. The Government has certain rights in the invention.--

Signed and Sealed this
Ninth Day of April, 2024

Katherine Kelly Vidal
*Director of the United States Patent and Trademark Office*